(12) United States Patent
Lai et al.

(10) Patent No.: US 10,136,265 B2
(45) Date of Patent: Nov. 20, 2018

(54) TRACE/TRAJECTORY RECONSTRUCTION VIA WEARABLE AND/OR MOBILE SENSORS FOR INDOOR/OUTDOOR LOCATION

(71) Applicant: International Business Machines Corporation, Armonk, NY (US)

(72) Inventors: Jui-Hsin Lai, White Plains, NY (US); Lifeng Nai, Atlanta, GA (US); Toyotaro Suzumura, New York City, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/263,314

(22) Filed: Sep. 12, 2016

(65) Prior Publication Data
US 2018/0077536 A1 Mar. 15, 2018

(51) Int. Cl.
*H04W 24/00* (2009.01)
*H04W 4/04* (2009.01)
*H04W 4/70* (2018.01)

(52) U.S. Cl.
CPC ............. *H04W 4/043* (2013.01); *H04W 4/70* (2018.02)

(58) Field of Classification Search
CPC .............................. H04W 4/005; H04W 4/043
USPC ................... 455/456.1–456.6, 457
See application file for complete search history.

(56) References Cited

U.S. PATENT DOCUMENTS

| | | | |
|---|---|---|---|
| 7,145,507 B2 | 12/2006 | Luo et al. | |
| 8,340,694 B2 | 12/2012 | Forstall et al. | |
| 9,068,844 B2 | 6/2015 | Kahn et al. | |
| 2009/0309759 A1 | 12/2009 | Williams | |
| 2013/0171596 A1* | 7/2013 | French | G09B 19/00 434/236 |

(Continued)

FOREIGN PATENT DOCUMENTS

CA 2772058 A1 9/2013

OTHER PUBLICATIONS

Supervised learning. Downloaded from https://en.wikipedia.org/wiki/Supervised_learning on Aug. 22, 2016. pp. 1-7.

(Continued)

*Primary Examiner* — Joshua Schwartz
(74) *Attorney, Agent, or Firm* — Daniel P. Morris; Otterstedt, Ellenbogen & Kammer, LLP.

(57) ABSTRACT

At a mobile electronic device, first sensor data is obtained from at least one wearable muscle sensor, suggesting that location tracking will imminently be desirable. A first indication that an external locator signal is not usable is also obtained. Responsive to the first sensor data and the indication, second sensor data, from at least one wearable muscle sensor, indicative of motion of a subject wearing the at least one muscle sensor, is recorded. A second indication that the external locator signal is now usable is obtained. Responsive to the second indication, the external locator signal is used to determine a current location of the mobile electronic device; and the second sensor data is sued to backtrack from the current location of the mobile electronic device to indicate a location of the mobile electronic device at a time when the recording of the second sensor data was initiated.

14 Claims, 6 Drawing Sheets

(56) References Cited

U.S. PATENT DOCUMENTS

2014/0067494 A1* 3/2014 Squires .............. G09B 19/0038
705/14.1
2014/0309864 A1 10/2014 Ricci
2015/0039224 A1 2/2015 Tuukkanen et al.
2017/0328718 A1* 11/2017 Karvounis ............... G01C 5/06

OTHER PUBLICATIONS

Fletcher et al, Wearable Sensor Platform and Mobile Application for Use in Cognitive Behavioral Therapy . . . and PTSD. 33rd Annual Conf. of the IEEE EMBS, 2011, pp. 1-4.
Ling Pei et al, Human Behavior Cognition Using Smartphone Sensors. Sensors, 2013, 13, pp. 1402-1424.
Gyroscope, downloaded from https://en.wikipedia.org/wiki/Gyroscope Aug. 30, 2016 pp. 1-9.
Vibrating structure gyroscope, pp. 1-5 downloaded Aug. 30, 2016 from https://en.wikipedia.org/wiki/Vibrating_structure_gyroscope#MEMS_gyroscopes.
Inertial measurement unit, pp. 1-5 downloaded Aug. 30, 2016 from https://en.wikipedia.org/wiki/Inertial_measurement_unit.
Support vector machine, pp. 1-16 downloaded Aug. 30, 2016 from https://en.wikipedia.org/wiki/Support_vector_machine.
Decision tree learning, pp. 1-7 downloaded Aug. 30, 2016 from https://en.wikipedia.org/wiki/Decision_tree_learning.

* cited by examiner

TRACE/TRAJECTORY RECONSTRUCTION VIA WEARABLE AND/OR MOBILE SENSORS FOR INDOOR/OUTDOOR LOCATION

BACKGROUND

The present disclosure relates to applications of mobile technology and to tracking devices and the like.

Satellite navigation systems employ satellites to provide autonomous geo-spatial positioning. The Global Positioning System (GPS) is a non-limiting example. Satellite navigation is helpful and widely used. However, the GPS signal is not always accessible e.g., in an underground parking space.

Indeed, common external locators (e.g. GPS) are not always helpful, due to poor connections or incomplete signal coverage, especially for indoor use or in bad weather. Furthermore, some locators (e.g. GPS) may not recognize movement such as climbing a staircase or taking an elevator.

SUMMARY

Embodiments of the present disclosure provide techniques for trace/trajectory reconstruction via wearable and/or mobile sensors for indoor/outdoor location.

In one aspect, an exemplary method is provided that includes obtaining, at a mobile electronic device, first sensor data, from at least one wearable muscle sensor, suggesting that location tracking will imminently be desirable; obtaining, at the mobile electronic device, a first indication that an external locator signal is not usable at the mobile electronic device; and, responsive to the first sensor data and the indication, recording, at the mobile electronic device, second sensor data, from at least one wearable muscle sensor, indicative of motion of a subject wearing the at least one muscle sensor. The method further includes obtaining, at the mobile electronic device, a second indication that the external locator signal is now usable at the mobile electronic device; and, responsive to the second indication, using the external locator signal to determine a current location of the mobile electronic device; and using the second sensor data to backtrack from the current location of the mobile electronic device to indicate a location of the mobile electronic device at a time when the recording of the second sensor data was initiated.

In another aspect, an exemplary mobile electronic device includes a memory; a sensor interface; an input/output interface; and at least one processor, coupled to the memory, the input/output interface, and the sensor interface, and operative to obtain, via the sensor interface, first sensor data, from at least one wearable muscle sensor, suggesting that location tracking will imminently be desirable; obtain a first indication that an external locator signal is not usable at the mobile electronic device; and, responsive to the first sensor data and the indication, record, in the memory, second sensor data obtained via the sensor interface, from at least one wearable muscle sensor, indicative of motion of a subject wearing the at least one muscle sensor. The at least one processor is further operative to obtain a second indication that the external locator signal is now usable at the mobile electronic device; and, responsive to the second indication, use the external locator signal to determine a current location of the mobile electronic device; and use the second sensor data to backtrack from the current location of the mobile electronic device to indicate a location of the mobile electronic device at a time when the recording of the second sensor data was initiated.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide the ability to locate subjects or objects when a GPS signal is not accessible, based on wearable muscle sensors and mobile devices such as a smart phone, which can collect data from the sensors for trace recovery.

These and other features and advantages of the present invention will become apparent from the following detailed description of illustrative embodiments thereof, which is to be read in connection with the accompanying drawings.

DETAILED DESCRIPTION

Figure 1:
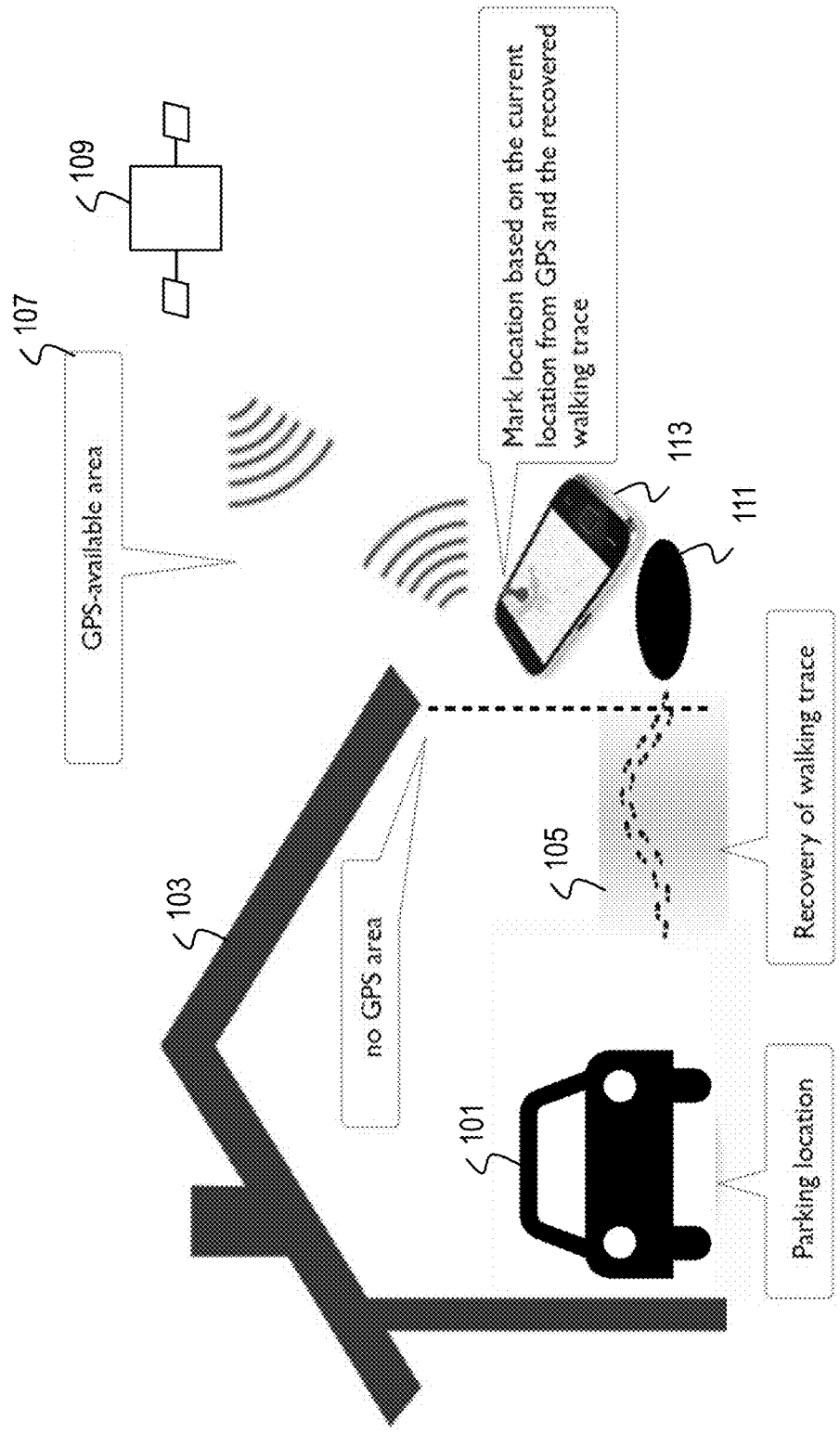
FIG. 1 is a diagram of an exemplary system and use case, in accordance with an aspect of the invention.

One or more embodiments advantageously provide techniques to locate automobiles and/or other objects, and/or human subjects, when a GPS signal is not accessible (e.g., at an underground parking spot), based on wearable muscle sensors, accelerometers, and/or gyroscopes, and mobile devices such as a smart phone, which can collect data from the sensors for trace recovery.

Advantageously, one or more embodiments do not require a vehicle-mounted location unit, but rather are behavior-based. One or more embodiments leverage muscle sensors for detection. Indeed, one or more embodiments employ wearable muscle sensors to collect multi-channel movement and/or action signals, which are processed to train a classifier regarding user behaviors, such as driving, walking, turning, and parking. In one or more embodiments, the classifier is used to monitor the user's behavior and detect possible automobile parking actions. Once detected, the location is recorded if GPS data is accessible; otherwise, a mobile device is used for contiguously collecting data from the sensors, to estimate the trace. The monitoring terminates when a GPS signal is found and then the real parking spot is computed based on the current GPS coordinates and the trace recovered from the muscle sensor data.

One or more embodiments collaboratively utilize wearable sensors and mobile devices for location tracking. Wearable sensors are more comfortable and useful for movement detection, as compared to motion sensors (e.g., infrared sensors) fixed on the wall or fixed camera(s) for detecting human movement. In one or more embodiments, gesture series can reconstruct movement trajectory, even when external locators such as GPS are inaccessible. Trajectory information can be used, for example, to locate missing children, cars parked in forgotten locations, and missing personal belongings, as well as for monitoring patients.

In a non-limiting use case, senior citizens or patients can be monitored in indoor locations with limited cellular network connectivity, using sensors such as calf-mounted sensors on the lower legs. A child on a hiking trip could be monitored using insole-mounted sensors in hiking boots, in a case when a hiking trail lacks GPS and/or cellular signals. For cave exploration, the trace of a spelunker can be monitored from where he or she enters the cave, so that he or she can exit by the same way (i.e., retracing his or her steps), rather than being lost in unknown territory with no GPS or cellular connections. A parked car can be located without marking when parking, without the need to rely on any on-vehicle device—parking behavior can be automatically captured by sensors.

External locators (e.g. GPS), as noted, do not always help due to poor connections or incomplete signal coverage, especially for indoor use or in bad weather. Some locators (e.g. GPS) may not recognize movement such as climbing a staircase or taking an elevator. Trace and/or trajectory are more useful than location coordinates in many cases, but need to be reconstructed when the signals of external locators are not available.

Thus, existing solutions rely on GPS, Bluetooth (registered mark of Bluetooth SIG, Inc. Kirkland WASHINGTON USA), and/or cellular signals, and are not useful in places where GPS or other appropriate signals are not available. Current techniques typically require manually flagging or marking of parking locations, and/or cannot reconstruct trace and/or trajectory information when GPS or other appropriate signals are not available. Wearable devices are, at present, typically used for sport training or healthcare only.

One or more embodiments recognize movement behavior patterns (e.g. driving, walking, climbing, taking an elevator) and the duration of each pattern. Consider a non-limiting example of a behavior pattern for car driving: hands engage in steering wheel operation; foot and leg engage in brake and gas pedal control. Consider also a non-limiting example of a behavior pattern for taking an elevator. The whole body is still; a gravity sensor senses lifting (when the elevator starts) and then dropping (when the elevator stops). Furthermore with regard to sensors, one or more embodiments include X, Y, and Z accelerometers (i.e. an accelerometer for each Cartesian coordinate or a single accelerometer that can sense acceleration in three dimensions), a gyroscope sensor for rotation detection, and a barometer for altitude change.

One or more embodiments concatenate the sequential movement behaviors to form a trace. The patterns change in time series; e.g., take an elevator, drive a car, park a car, walking forward, . . . One or more embodiments coordinate with GPS signals once such signals become available; e.g., annotate a map with recognized behaviors and link the map with locations from the GPS (when those are available).

Consider that recovering a parking location is trivial when the parking area does have adequate GPS or cellular signal coverage. One or more embodiments advantageously permit recovering parking location when such coverage is not available. One or more embodiments estimate the driver's path (once he or she has parked and become a pedestrian) by sensing walking and turning from the legs (reconstructing the trace of the driver as a pedestrian), then stop the estimation when GPS is again available, thus providing seamless interaction with external locators.

Referring now to FIG. 1, consider an automobile 101 parked within a region 103 having no GPS coverage (e.g., underground parking garage). The walking trace 105 of the driver as pedestrian is recovered from sensors, as just described, until the driver as pedestrian reaches a location 111 lying within an area 107 where GPS signals are again available (from satellites such as satellite 109). The driver's smart phone 113 marks the location of the parked car based on the current location from the GPS signals and the recovered walking trace. For example, the driver parks at location 101, where there is no GPS signal. The driver then walks 100 meters north and 50 meters west, and this trace is recorded by smart phone 113. When smart phone 113 reaches location 111, it determines its location via GPS, and then determines the car's location to be 50 meters east and 100 meters south from the smart phone's current location.

Figure 2:
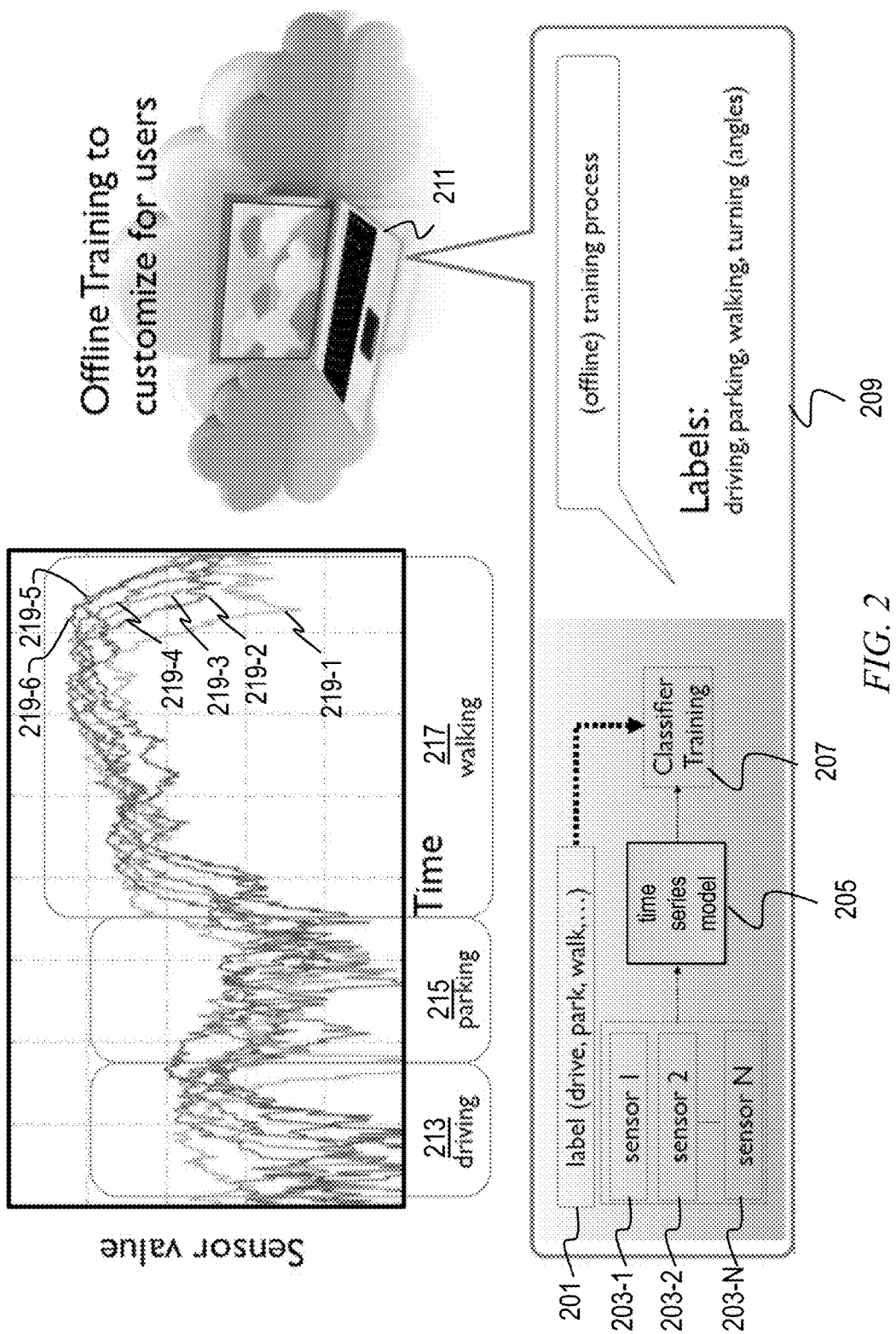
FIG. 2 shows an offline training process, in accordance with an aspect of the invention.

FIG. 2 depicts an offline training mode. A number of different sensors 203-1, 203-2, 203-N (collectively, 203) are affixed to an individual human (in this non-limiting example, N=six sensors). These sensors provide signals 219-1, 219-2, 219-3, 219-4, 219-5, and 219-6 (collectively 219), which are plotted against time. The sensor output signals are monitored during times when the human subject is engaging in known activities; namely, driving 213, parking 215, and walking 217. A time series model 205 is generated from the signals 219-1, 219-2, 219-3, 219-4, 219-5, and 219-6 from the sensors 203-1, 203-2, 203-N. A classifier 207 is trained offline by annotating the time series with known labels 201, e.g., driving, parking, walking, turning, and so on, as part of offline training process 209. This process takes place, for example, on a desktop or laptop computer 211. Suitable techniques include supervised learning via support vector machines or decision trees. Some embodiments employ training from a representative sample of people for trajectory prediction. Other embodiments train on the data of a specific individual who will use the device, for greater accuracy. Supervised learning is a category of machine learning. Support vector machines (SVM) are a powerful tool in supervised learning. Decision tree learning is another tool in supervised learning. Given the teachings herein, the skilled artisan will be able to implement one or more embodiments using machine learning techniques such as supervised learning, SVMs, decision tree learning, and the like.

Figure 3:
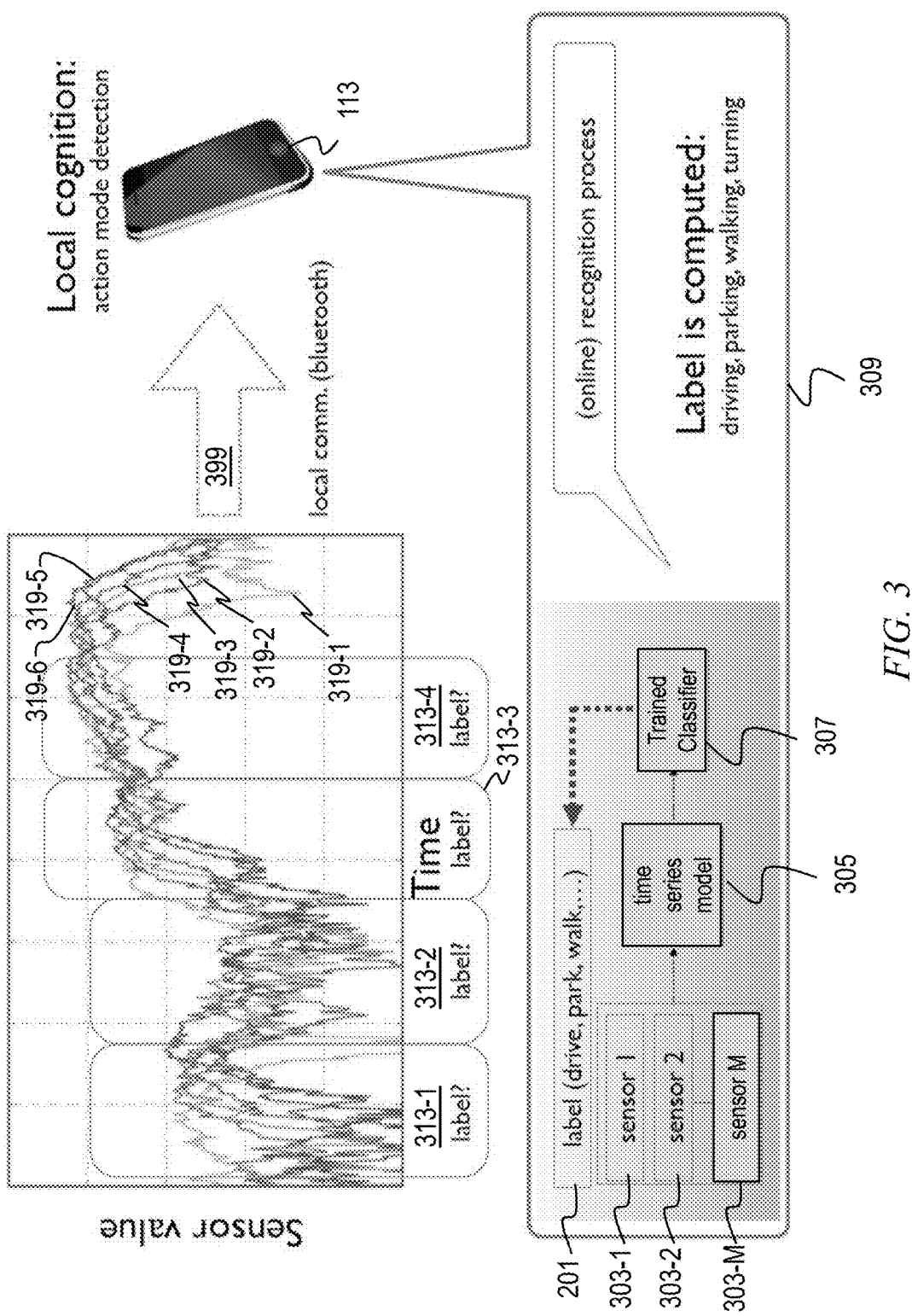
FIG. 3 shows an online recognition process, in accordance with an aspect of the invention.

Once the classifier is trained, it can be used online for location tracing via an online process 309, as shown in FIG. 3. In particular, signals 319-1, 319-2, 319-3, 319-4, 319-5, and 319-6 (collectively 319) are observed by smart phone 113 from the sensors 303-1, 303-2, 303-M (collectively 303), and result in a time series model 305. The now-trained classifier 307 can apply the appropriate label 201 to each of the unknown signal regimes 313-1, 313-2, 313-3, 313-4 (collectively 313); e.g., driving, parking, walking. Note that in general, the sensor readings in the real case (FIG. 3) will be different from the training readings (FIG. 2), although they will be similar within regions having the same label. Furthermore, the number of sensor channels can be variant (e.g., N in FIG. 2 and M in FIG. 3 can be the same or different). As seen at 399, the sensor values are communicated to the smart phone 113 via, e.g., Bluetooth wireless connection or the like. For example, once the smart phone detects parking based on the sensor input, it knows to begin making a walking trace once walking is detected.

Figure 4:
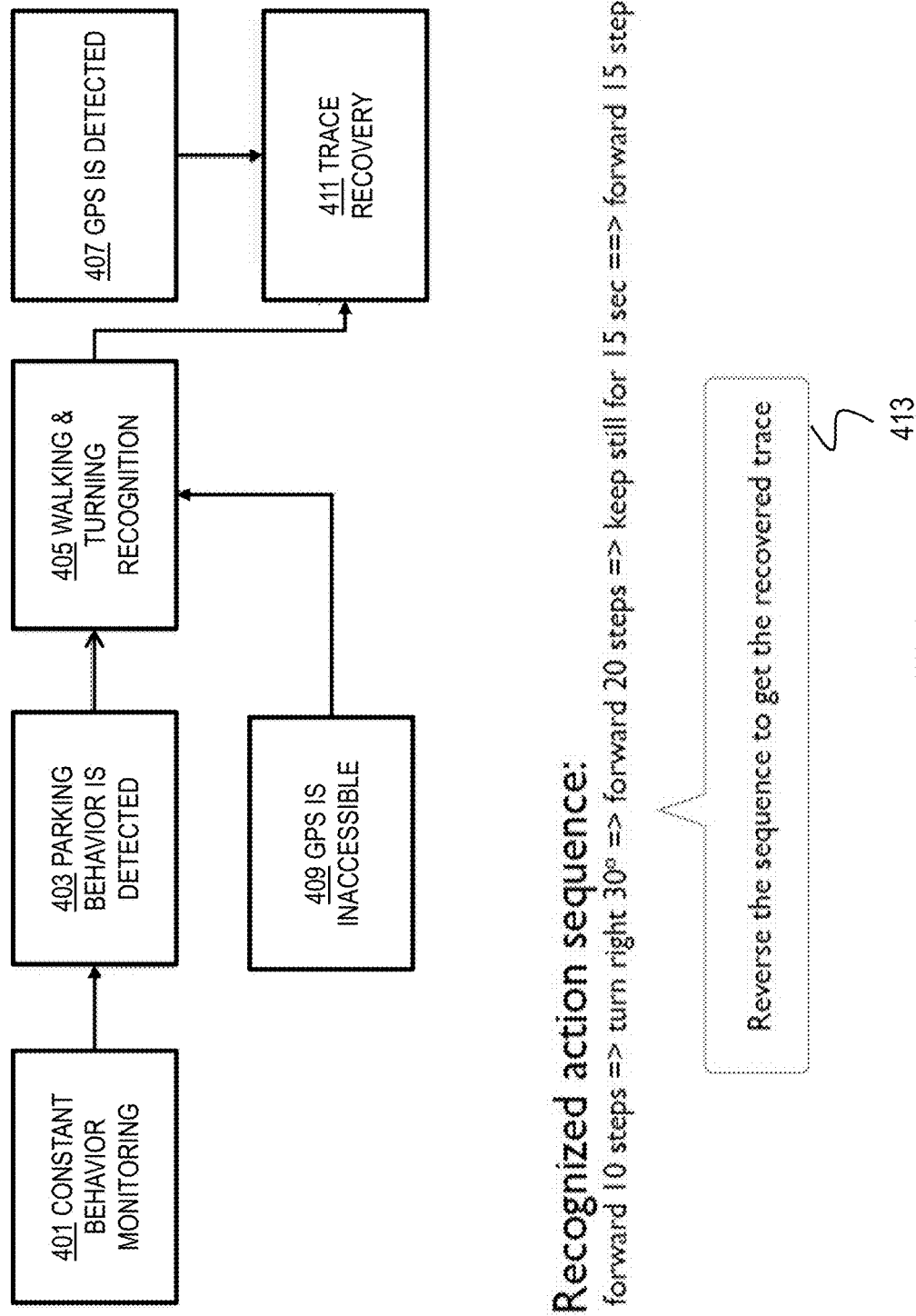
FIG. 4 shows a flow chart, in accordance with an aspect of the invention.

FIG. 4 shows an exemplary flow chart and trace recovery process. In step 401, constantly monitor the behavior of a human subject who is wearing sensors 303 from FIG. 3 online detection and carrying smart phone 113, by providing the sensor signals to the classifier 307 which has been trained in the training process to label sensor values with the corresponding activity (e.g., driving, parking, walking, turning, . . . ). In step 403, classifier labels the signals with the "parking" label indicating that parking behavior is detected. The smart phone now knows that the human subject is likely to walk from the parked car and so in step 405, if a GPS signal is not available, as at 409, walking and turning behavior is recognized. This continues until a GPS signal is again detected as at step 407, at which point trace recovery is undertaken in step 411. The unit then "works backwards" from the currently known position (based on the GPS) to determine where the car was parked. In particular, as seen at 413, suppose the unit, in step 405, detected walking ten steps forward, turning right thirty degrees, walking forward twenty steps, keeping still for 15 seconds, and walking forward fifteen steps. The unit determines the location of the car as the GPS location less the reverse of the trace.

In one or more embodiments, one or more accelerometers sensitive in the three Cartesian coordinate directions can detect altitude change when a subject is in an elevator. Once accelerometer readings for movement detection and gyroscope readings for rotation detection are available, it is possible to reconstruct the subject's path in the three-dimensional world.

One or more embodiments thus provide a method and/or system for reconstructing trace and/or trajectory based on muscle and/or wearable sensors and mobile devices. Locations are automatically recorded based on detected behavior series. Trace recovery is carried out via machine learning on muscle sensors, in instances when a GPS or cellular connection is inaccessible. When the GPS or cellular connection is again detected, the reconstructed trace is annotated on a map, according to the movement behavior, and the location is marked based on the recovered trace and the GPS data.

In one or more embodiments, the system infers a subject's behaviors (walking, running, driving, etc.) from the output of one or more wearable sensors. Furthermore, in one or more embodiments, the system concatenates sequential movement behaviors to recover the trace information.

Given the discussion thus far, it will be appreciated that, in general terms, an exemplary method, according to an aspect of the invention, includes the step of obtaining, at a mobile electronic device, first sensor data, from at least one wearable muscle sensor, suggesting that location tracking will imminently be desirable. A non-limiting example of a mobile electronic device is the smart phone 113; other examples include a tablet, a laptop computer, and the like. The mobile electronic data can obtain the data 319 from the sensors, for example, wirelessly such as via a BLUETOOTH connection or the like as seen at 399. A non-limiting example of data suggesting that location tracking will imminently be desirable is data that is classified and labeled as "parking" behavior by classifier 207; see step 403.

A further step includes obtaining, at the mobile electronic device, a first indication that an external locator signal is not usable at the mobile electronic device. See step 409. As used herein, an external locator signal is not usable when it is non-existent, present but with has a signal-to-noise ratio too low to function properly, or when the device 113 cannot or should not use the signal for some other reason (e.g., low battery power). Non-limiting examples of an external locator signal include a satellite navigation or satnav system such as the NAVSTAR Global Positioning System (GPS) and the Russian GLONASS system; as well as wireless mobile telecommunications technology networks (3G or 4G, for example) or even a Wi-Fi or LAN signal in a premises (e.g., when an elderly person wanders away from a premises with a Wi-Fi network). For example, a GPS module 599 or 3G/4G module 504 on phone 113 sends a message to the phone's processor 502 that there is no network coverage, or battery management module 516 tells the user to turn off the GPS 599 due to low power (or does so automatically).

A still further step includes, responsive to the first sensor data and the indication, recording, at the mobile electronic device, second sensor data, indicative of motion of a subject wearing the at least one muscle sensor. See step 405. This second sensor data could be, for example, data from a cell phone accelerometer and gyroscope; data from a barometer; and/or muscle sensor data. Non-limiting examples of muscle sensors include calf-mounted sensors. Insole mounted pressure sensors could be used in lieu of, or in addition to, muscle sensors, in some embodiments. One non-limiting example of a suitable muscle sensor is the Myo™ band available from Thalmic Labs Inc., Kitchener, Ontario N2G 1H2, Canada. In one or more embodiments, an app 545 (see FIG. 5) on the phone 113 has logic to see if the conditions to trigger recording are met, or else browser code is run in browser 597 on the phone 113 to do the same. A local app 545 is preferred in cases when there is no network coverage.

An even further step includes obtaining, at the mobile electronic device, a second indication that the external locator signal is now usable at the mobile electronic device. See step 407. This step can be carried out, for example, via the GPS module or 3G/4G module on the phone sending a message to the phone's processor that there is again usable network coverage, or the battery management module telling the user to turn on the GPS due to recharged battery (or doing that automatically when connected to a charger, or the user seeing that he or she will soon have a charger available and so turning the GPS back on manually). Again, in one or more non-limiting examples, trace recovery is initiated when a GPS signal is recovered.

In the exemplary method, responsive to the second indication, the external locator signal is used in a conventional manner to determine the current location of the mobile electronic device. As per, e.g., step 411, the second sensor data is then used to backtrack from the current location of the mobile electronic device to indicate a location of the mobile electronic device at a time when the recording of the second sensor data was initiated. For example, in FIGS. 1, 3 and 4, once phone 113 gets to location 111, communicate with satellite(s) 109 to obtain the current location and then subtract out the trace 105 to backtrack to the car location at 101. For example, processor 502 continually calculates the subject/phone's current position. First, for each of the six degrees of freedom (x, y, z and θx, θy and θz), it integrates over time the sensed acceleration, together with an estimate of gravity, to calculate the current velocity (based on data from unit 511). Then it integrates the velocity to calculate the current position. This trace is then subtracted from the actual position detected when the GPS is again available. In addition or alternatively, training of the classifier can be carried out to recognize walking and turning from the muscle sensors and this data used to generate the trace.

In some instances, a further step includes analyzing the first sensor data with a pre-trained classifier 307 on the mobile electronic device 113 to determine that the location tracking will imminently be desirable (e.g., smart phone 113 has classifier 307 that labels received sensor data as "parking" indicating that person will likely soon exit car and walk). For example, in one or more embodiments, the pre-trained classifier includes at least classes of driving, walking, and parking, and the first sensor data corresponds to the parking class (e.g. actual obtained data similar to data 215 labeled as parking during training process). At least some embodiments further include a class labeled "turning" based on gyroscope input, to track a pedestrian's turns while walking.

The "backtracked" location of the motor vehicle 101 can be displayed on the screen of smart phone 113 with directions and/or as part of a map overlay; this indicated location can then be used to find the parked motor vehicle (or other missing property, a lost human subject, or the like). Thus, in the recording step, the subject may be, for example, an adult, a child, an elderly person, a medical patient, or the like. In the case of a child, parents can provide the child with a mobile device (a smartphone is a non-limiting example) to record their child's motion trajectory. The device can include an audio navigation to guide the child home.

In some instances, the method further includes training the classifier as described with respect to FIG. 2.

In addition to or in lieu of worn, muscle sensors, in some cases at least the second data (and optionally the first data) further includes data from an accelerometer or a pressure transducer, to detect vertical motion.

Given the discussion thus far, it will be appreciated that, in general terms, another exemplary method, according to another aspect of the invention, includes the step of recording, at a mobile electronic device, first sensor data, from at least one sensor, indicative of motion of a subject wearing or carrying the at least one sensor. The sensor data could include, for example, data from one or more accelerometers and a gyroscope, and or muscle sensor or pressure sensor data. See, e.g., step 405. A non-limiting example of a mobile electronic device is the smart phone 113; other examples include a tablet, a laptop computer, and the like. A further step includes obtaining, at the mobile electronic device, an indication that trace recovery is desired. This could be, for example, a manual input, recovery of a GPS or other network signal, or the like. See, e.g., step 407. An even further step includes, responsive to the indication that the trace recovery is desired, using the first sensor data to backtrack from a current location of the mobile electronic device to indicate a desired previous location of the mobile electronic device (e.g., parking place 101).

In some instances, a further step includes obtaining, at the mobile electronic device, a first indication that an external locator signal is not usable at the mobile electronic device. See step 409. As used herein, an external locator signal is not usable when it is non-existent, present but with has a signal-to-noise ratio too low to function properly, or when the device 113 cannot or should not use the signal for some other reason (e.g., low battery power). Non-limiting examples of an external locator signal include a satellite navigation or satnav system such as the NAVSTAR Global Positioning System (GPS) and the Russian GLONASS system; as well as wireless mobile telecommunications technology networks (3G or 4G, for example), or even a Wi-Fi signal or the like (e.g., when an elderly person wanders away from a premises with a Wi-Fi network). In one or more embodiments, a GPS module or 3G/4G module on the smart phone sends a message to the phone's processor that there is no network coverage, or a battery management module tells the user to turn off GPS due to low power (or does so automatically). In such cases, the recording of the first sensor data can be responsive at least to the indication that the external locator signal is not usable at the mobile electronic device.

In some cases, an even further step includes obtaining, at the mobile electronic device, an indication that the external locator signal is now usable at the mobile electronic device. See step 407. This step can be carried out, for example, via the GPS module or 3G/4G module on the phone sending a message to the phone's processor that there is again usable network coverage, or the battery management module telling the user to turn on the GPS due to recharged battery (or doing that automatically when connected to a charger, or the user seeing that he or she will soon have a charger available and so turning the GPS back on manually). Again, in one or more non-limiting examples, trace recovery is initiated when a GPS signal is recovered.

In the exemplary method, responsive to the second indication, the external locator signal is used in a conventional manner to determine the current location of the mobile electronic device. As per, e.g., step 411, the first sensor data is then used to backtrack from the current location of the mobile electronic device to indicate a location of the mobile electronic device at a time when the recording of the second sensor data was initiated. For example, in FIGS. 1, 3 and 4, once phone 113 gets to location 111, communicate with satellite(s) 109 to obtain the current location and then subtract out the trace 105 to backtrack to the car location at 101. Trace recovery is discussed elsewhere herein.

Some embodiments further include obtaining, at the mobile electronic device, second sensor data, from at least one wearable muscle sensor (in some cases, could be the at least one sensor mentioned above), suggesting that location tracking will imminently be desirable. The mobile electronic data can obtain the data 319 from the sensors, for example, wirelessly such as via a BLUETOOTH connection or the like. A non-limiting example of data suggesting that location tracking will imminently be desirable is data that is classified and labeled as "parking" behavior by classifier 307; see step 403. In such cases, the recording, at the mobile electronic device, of the first sensor data is further responsive to the second sensor data.

Data from at least one wearable muscle sensor can be fed to the classifier to classify behavior and in some instances can also be used for trace recovery (as it can be indicative of motion of a subject wearing the at least one muscle sensor). Non-limiting examples of muscle sensors include calf-mounted sensors. Insole-mounted pressure sensors could be used in lieu of, or in addition to, muscle sensors, in some embodiments. One non-limiting example of a suitable muscle sensor is the Myo™ band available from Thalmic Labs Inc., Kitchener, Ontario N2G 1H2, Canada. In one or more embodiments, an app 545 (see FIG. 5) on the phone 113 has logic to see if the conditions to trigger recording are met, or else browser code is run in browser 597 on the phone 113 to do the same. A local app 545 is preferred in cases when there is no network coverage.

In some instances, a further step includes analyzing the second sensor data with a pre-trained classifier 307 on the mobile electronic device 113 to determine that the location tracking will imminently be desirable (e.g., smart phone 113 has classifier 307 that labels received sensor data as "parking" indicating that person will likely soon exit car and walk). For example, in one or more embodiments, the pre-trained classifier includes at least classes of driving, walking, and parking, and the second sensor data corresponds to the parking class (e.g. actual obtained data similar to data 215 labeled as parking during training process). At least some embodiments further include a class labeled "turning" based on gyroscope input, to track a pedestrian's turns while walking.

The "backtracked" location of the motor vehicle 101 can be displayed on the screen of smart phone 113 with directions and/or as part of a map overlay; this indicated location can then be used to find the parked motor vehicle (or other missing property, a lost human subject, or the like). Thus, in the recording step, the subject may be, for example, an adult, a child, an elderly person, a medical patient, or the like). In the case of a child, parents can provide the child with a mobile device (a smartphone is a non-limiting example) to record their child's motion trajectory. The device can include an audio navigation to guide the child home.

In some instances, the method further includes training the classifier as described with respect to FIG. 2.

In addition to or in lieu of worn, muscle sensors, in some cases at least the first data (and optionally the second data) further includes data from an accelerometer or a pressure transducer, to detect vertical motion.

Exemplary Mobile Device

Figure 5:
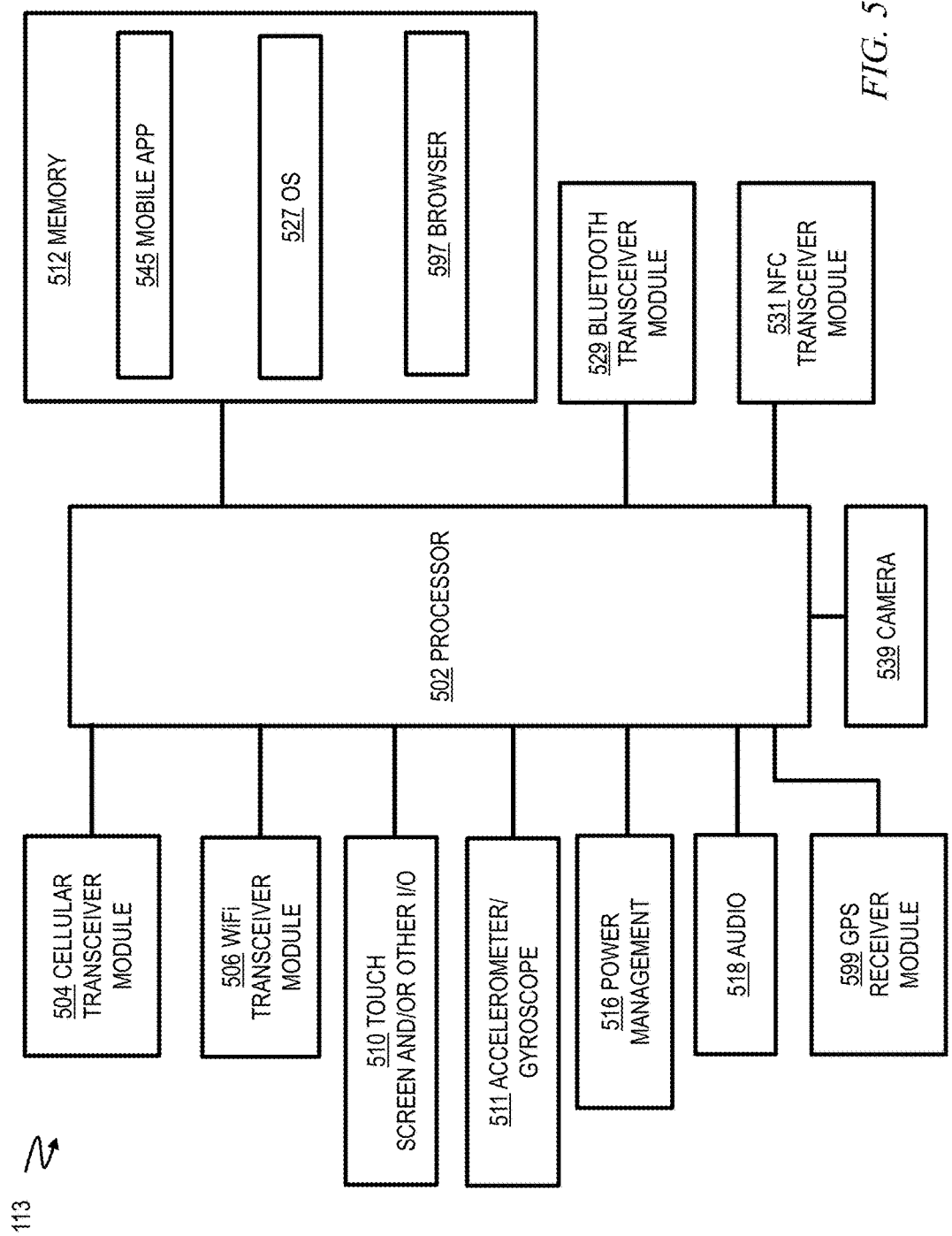
FIG. 5 is a block diagram of a "smart" phone or tablet computer useful in one or more embodiments of the invention.

FIG. 5 is a block diagram of an exemplary mobile electronic device such as a tablet computing device, netbook, laptop, or smart phone 113 or the like. Unit 113 includes a suitable processor; e.g., a microprocessor 502. A cellular transceiver module 504 coupled to processor 502 includes an antenna and appropriate circuitry to send and receive cellular telephone signals, e.g., 3G or 4G. In some cases, a Wi-Fi transceiver module 506 coupled to processor 502 includes an antenna and appropriate circuitry to allow unit 113 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 529 coupled to processor 502 includes an antenna and appropriate circuitry to allow unit 113 to connect to other devices (e.g. muscle sensors) via the Bluetooth wireless technology standard. In some cases, an NFC transceiver module 531 coupled to processor 502 includes an antenna and appropriate circuitry to allow unit 113 to establish radio communication via near-field communications.

Operating system (OS) 527 orchestrates the operation of unit 113.

Touch screen 510 coupled to processor 502 is also generally indicative of a variety of input/output (I/O) devices such as a keypad, another type of display, a mouse or other pointing device, and so on, all of which may or may not be present in one or more embodiments. Audio module 518 coupled to processor 502 includes, for example, an audio coder/decoder (codec), speaker, headphone jack, microphone, and so on. Power management system 516 can include a battery charger, an interface to a battery, and so on. Memory 512 is coupled to processor 502. Memory 512 can include, for example, volatile memory such as RAM, and non-volatile memory such as ROM, flash, or any tangible computer-readable recordable storage medium which stores information in a non-transitory manner. Processor 502 will typically also have on-chip memory.

A digital camera 539 is coupled to processor 502 in some cases.

A GPS receiver module 599 coupled to processor 502 includes an antenna and appropriate circuitry to allow device 113 to calculate its position by precisely timing the signals sent by GPS satellites high above the Earth. Corresponding software resides in memory 512.

Note that elements in FIG. 5 are shown connected directly to processor 502; however, one or more bus structures can be employed in one or more embodiments. Furthermore, elements shown as implemented in software may be implemented at least in part in hardware for speed, if desired.

Browser program 597 in memory 512 deciphers hypertext markup language (html) served out by a server for display on screen 510 or the like.

An accelerometer and gyroscope 511 are coupled to the processor 502 for trace reconstruction as described herein; e.g., a vibrating structure gyroscope with accelerometers forming an inertial measurement unit, manufactured with MEMS technology. Such units are known in the art in and of themselves; given the teachings herein, the skilled artisan will able to use same to implement one or more embodiments of the invention. A barometric pressure transducer can be included in unit 511 or separately and coupled to processor 502 for altitude determination in connection with software in memory 512.

Application 545 in memory 512 can be provided as discussed elsewhere herein.

Every instance need not necessarily have every feature depicted in FIG. 5.

One or more embodiments of the invention, or elements thereof (e.g., the computer 211 or phone 113), can be implemented, at least in part, in the form of an apparatus including a memory and at least one processor that is coupled to the memory and operative to perform exemplary method steps.

Figure 6:
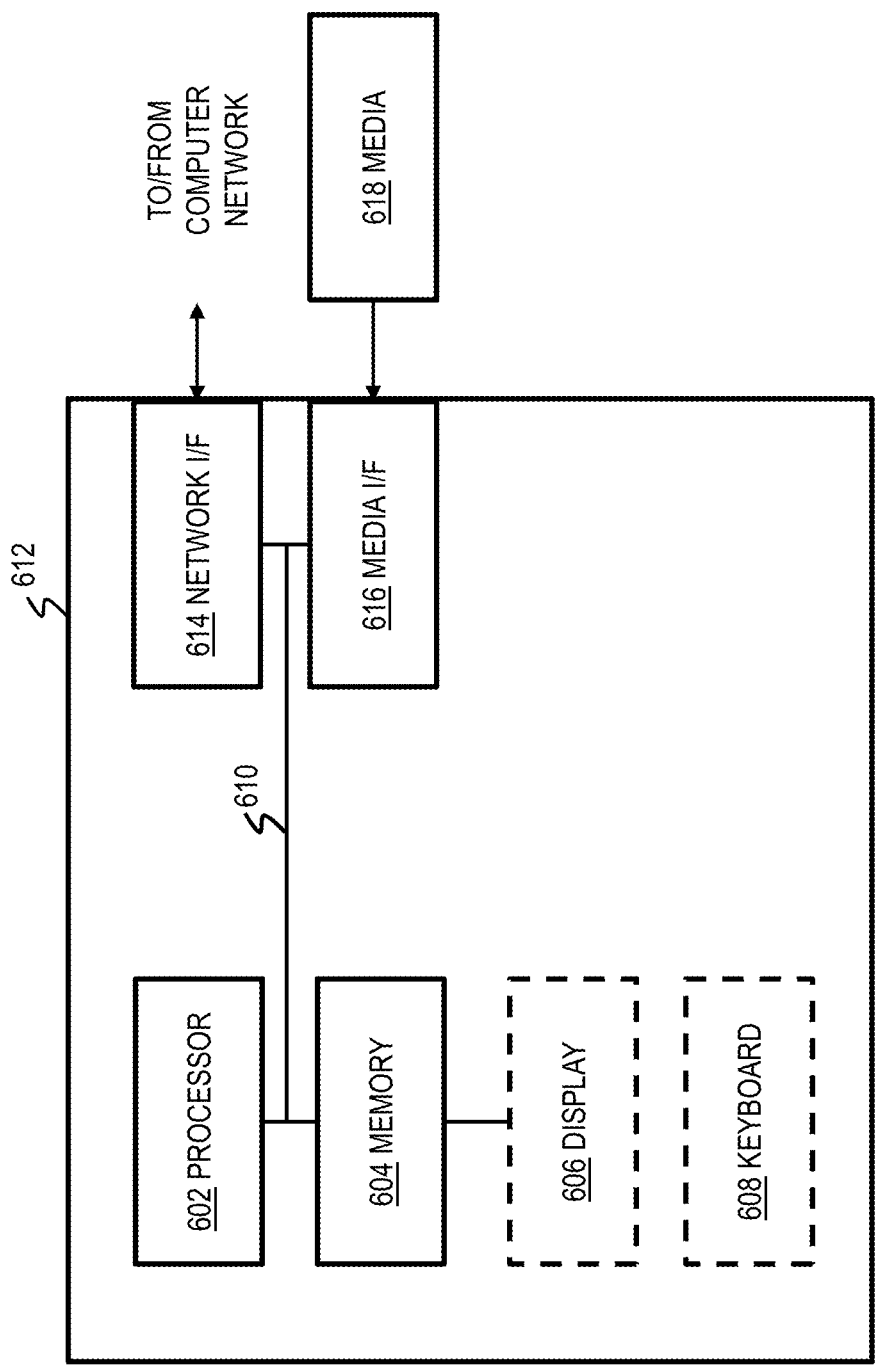
FIG. 6 depicts a computer system that may be useful in implementing one or more aspects and/or elements of the invention.

One or more embodiments can make use of software running on a general purpose computer or workstation (e.g. for training). With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer).

The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618. Network interface 614 is also representative of suitable interfaces to acquire signals and/or data (e.g., from sensors 203). Other interfaces could be used for such acquisition as well; e.g., analog-to-digital converters and the like.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

It should be noted that any of the methods described herein can include an additional step of providing a system comprising distinct software modules embodied on a computer readable storage medium (e.g., persistent storage portion of memory 512 and/or memory 604); the modules can include, for example, any or all of the elements depicted in the block diagrams or other figures and/or described herein. For example, the modules could include a user interface module (e.g., HTML code served out by a server to a browser of a client), a trained classifier with its data, numerical integration software to determine the trace from the sensor data, a sensor interface module, and so on. The method steps can then be carried out using the distinct software modules and/or sub-modules of the system, as described above, executing on one or more hardware processors 502, 602. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, at a mobile electronic device, first sensor data, from at least one wearable muscle sensor, said mobile electronic device having a pre-trained classifier including at least two classes of motion;
    analyzing said first sensor data with said pre-trained classifier on said mobile electronic device to determine that a given one of said at least two classes of motion is present;
    obtaining, at said mobile electronic device, a first indication that an external locator signal is not usable at said mobile electronic device;
    responsive to: (i) said analysis of said first sensor data and (ii) said indication, recording, at said mobile electronic device, second sensor data, indicative of motion of a subject wearing said at least one muscle sensor;
    obtaining, at said mobile electronic device, a second indication that said external locator signal is now usable at said mobile electronic device; and
    responsive to said second indication:
        using said external locator signal to determine a current location of said mobile electronic device; and
        using said second sensor data to backtrack from said current location of said mobile electronic device to indicate a location of said mobile electronic device at a time when said recording of said second sensor data was initiated.

2. The method of claim 1, wherein said at least two motion classes of said pre-trained classifier include at least classes of driving, walking, and parking, and wherein said given one of said classes comprises said parking class.

3. The method of claim 2, further comprising using said indicated location to find a parked motor vehicle.

4. The method of claim 1, further comprising training said classifier.

5. A mobile electronic device comprising:
    a memory storing at least a pre-trained classifier program including at least two classes of motion;
    a sensor interface;
    an input/output interface; and
    at least one processor, coupled to said memory, said input/output interface, and said sensor interface, and operative to:
        obtain, via said sensor interface, first sensor data, from at least one wearable muscle sensor;
        analyze said first sensor data with said pre-trained classifier program on said mobile electronic device to determine that a given one of said at least two classes of motion is present;
        obtain a first indication that an external locator signal is not usable at said mobile electronic device;
        responsive to: (i) said first sensor data and (ii) said indication, record, in said memory, second sensor data obtained via said sensor interface, indicative of motion of a subject wearing said at least one muscle sensor;

obtain a second indication that said external locator signal is now usable at said mobile electronic device; and responsive to said second indication:
  use said external locator signal to determine a current location of said mobile electronic device; and
  use said second sensor data to backtrack from said current location of said mobile electronic device to indicate a location of said mobile electronic device at a time when said recording of said second sensor data was initiated.

6. The mobile electronic device of claim 5, wherein said at least two motion classes of said pre-trained classifier include at least classes of driving, walking, and parking, and wherein said given one of said classes comprises said parking class.

7. The mobile electronic device of claim 6, further comprising using said indicated location to find a parked motor vehicle by displaying said location to said subject via said input/output interface.

8. The mobile electronic device of claim 5, wherein said classifier is pre-trained on a representative population.

9. The mobile electronic device of claim 5, wherein said classifier is pre-trained on said subject.

10. A non-transitory computer readable medium comprising computer executable instructions which when executed by a mobile electronic device cause the mobile electronic device to perform the method of:
  obtaining first sensor data, from at least one wearable muscle sensor, said instructions instantiating a pre-trained classifier including at least two classes of motion;
  analyzing said first sensor data with said pre-trained classifier on said mobile electronic device to determine that a given one of said at least two classes of motion is present;
  obtaining a first indication that an external locator signal is not usable at said mobile electronic device;
  responsive to: (i) said analysis of said first sensor data and (ii) said indication, recording second sensor data, indicative of motion of a subject wearing said at least one muscle sensor;
  obtaining a second indication that said external locator signal is now usable at said mobile electronic device; and
  responsive to said second indication:
    using said external locator signal to determine a current location of said mobile electronic device; and
    using said second sensor data to backtrack from said current location of said mobile electronic device to indicate a location of said mobile electronic device at a time when said recording of said second sensor data was initiated.

11. The non-transitory computer readable medium of claim 10, wherein said at least two motion classes of said pre-trained classifier include at least classes of driving, walking, and parking, and wherein said given one of said classes comprises said parking class.

12. The non-transitory computer readable medium of claim 11, wherein said computer executable instructions when executed by said mobile electronic device further cause the mobile electronic device to output said indicated location to help a user find a parked motor vehicle.

13. The non-transitory computer readable medium of claim 10, wherein said classifier is pre-trained on a representative population.

14. The non-transitory computer readable medium of claim 10, wherein said classifier is pre-trained on said subject.

* * * * *